(12) United States Patent
Gorzitzke et al.

(10) Patent No.: US 6,588,567 B2
(45) Date of Patent: Jul. 8, 2003

(54) PRESSURE PLATE ASSEMBLY

(75) Inventors: Klaus Gorzitzke, Gochsheim (DE);
Winfried Herterich, Wasserlosen (DE);
Wolfgang Knauer, Königsberg (DE);
Walter Lindner, Schwebheim (DE);
Achim Link, Schweinfurt (DE);
Gerhard Röll, Eisenheim (DE);
Reinhold Weidinger, Kolitzheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/962,885

(22) Filed: Sep. 25, 2001

(65) Prior Publication Data
US 2002/0043440 A1 Apr. 18, 2002

(30) Foreign Application Priority Data

Oct. 7, 2000 (DE) .......................... 100 49 649

(51) Int. Cl.⁷ .............................. F16D 13/75
(52) U.S. Cl. ................ 192/70.25; 192/111 A
(58) Field of Search ................ 192/70.25, 111 A (56) References Cited

U.S. PATENT DOCUMENTS 5,566,804 A * 10/1996 Gochenour et al. ...... 192/70.25
5,791,448 A * 8/1998 Gochenour et al. ...... 192/70.25

* cited by examiner

Primary Examiner—Richard M. Lorence
(74) Attorney, Agent, or Firm—Cohen, Pontani, Lieberman & Pavane (57) ABSTRACT

A pressure plate assembly for a friction clutch includes a housing, a pressure plate held in the housing arrangement with freedom to move axially, and a stored-energy element transmitting force along a path between the housing and the pressure plate. A wear-compensating device acting in the path of force transmission has at least one adjusting element able to move in an adjusting direction to compensate for wear. At least one spring element pretensions the minimum of one adjusting element for movement in the adjusting direction, where at least certain areas of the minimum of one spring element extend in the circumferential direction relative to the rotational axis (A). A support arrangement supports the area of the spring element extending essentially in the circumferential direction radially from the outside and/or radially from the inside relative to the rotational axis (A).

13 Claims, 4 Drawing Sheets

PRESSURE PLATE ASSEMBLY

BACKGROUND OF THE INVENTION

1. Field of the Invention

The present invention pertains to a pressure plate assembly for a friction clutch comprising a housing arrangement; a pressure plate held in the housing arrangement with freedom to move axially; a stored-energy element; and a wear-compensating device acting in the path of force transmission between the stored-energy element and the pressure plate and/or between the stored-energy element and the housing arrangement, where the wear-compensating device has at least one adjusting element able to move in an adjusting direction to compensate for wear and at least one spring element pretensioning the minimum of one adjusting element for movement in the adjusting direction, where at least certain areas of the minimum of one spring element extend in the circumferential direction with respect to the rotational axis.

2. Description of the Related Art

In pressure plate assemblies of this type, there is the fundamental problem that, as a result of the forces which occur during operation, comprising essentially centrifugal forces and the elastic forces produced within the minimum of one spring element, the minimum of one spring can come to rest against various other components of the pressure plate assembly, especially including the minimum of one adjusting element itself. As a result of this, additional frictional forces, which vary as a function of the operating conditions, are generated, which can oppose the movement of the adjusting device required to compensate for wear.

SUMMARY OF THE INVENTION

It is therefore the task of the present invention to provide a pressure plate assembly in which any unwanted frictional interaction between the minimum of one spring element and the wear-compensating device in particular is virtually excluded.

According to the invention, the spring element has a support arrangement to support the area of the spring extending essentially in the circumferential direction, this support being provided radially from the outside and/or radially from the inside with respect to the rotational axis.

The presence of the support arrangement prevents the minimum of one spring element from exerting pressure on the minimum of one adjusting element as a result of centrifugal forces, for example; or, depending on how the various components are installed, it prevents the minimum of one spring element from exerting pressure on the minimum of one adjusting element as a result of the elastic forces of the spring itself. When wear has occurred, therefore, this minimum of one adjusting element can then execute the required compensating movement without interference from frictional forces induced by contact with the spring element.

For example, it can be provided that the support arrangement forms a support channel for the minimum of one spring element on the pressure plate or on the housing arrangement, this channel having a boundary radially on the inside and another boundary radially on the outside.

In an embodiment which is preferred because of the ease with which it can be produced, it can be provided that the support arrangement has a support element attached to the pressure plate or to the housing arrangement, which element has a radially outer and a radially inner support wall. As an alternative, it is also possible, however, for the support arrangement to have a support recess in the pressure plate or in the housing arrangement with radially inner and radially outer boundaries. This design variant offers the advantage that the number of components to be prefabricated for a pressure plate assembly of this type can be kept small.

To make it possible for the minimum of one spring element to interact with the minimum of one adjusting element so that the adjusting element is pretensioned in the adjusting direction, it is proposed that the support channel have a channel wall separating the minimum of one spring element radially from the minimum of one adjusting element, and that the channel wall have at least certain areas which are open in the radial direction to allow the minimum of one spring element to interact with the minimum of one adjusting element.

In the pressure plate assembly according to the invention, furthermore, it is also possible for the wear-compensating device to act in the area between the stored-energy element and the pressure plate and for the support arrangement to be provided on the pressure plate. It is also possible for the minimum of one adjusting element to comprise an adjusting ring, which is able to rotate around the rotational axis to accomplish the adjustment and for the essential section of the minimum of one spring element to extend in the circumferential direction along or in the area of the adjusting ring.

The present invention also pertains to a friction clutch comprising a pressure plate according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
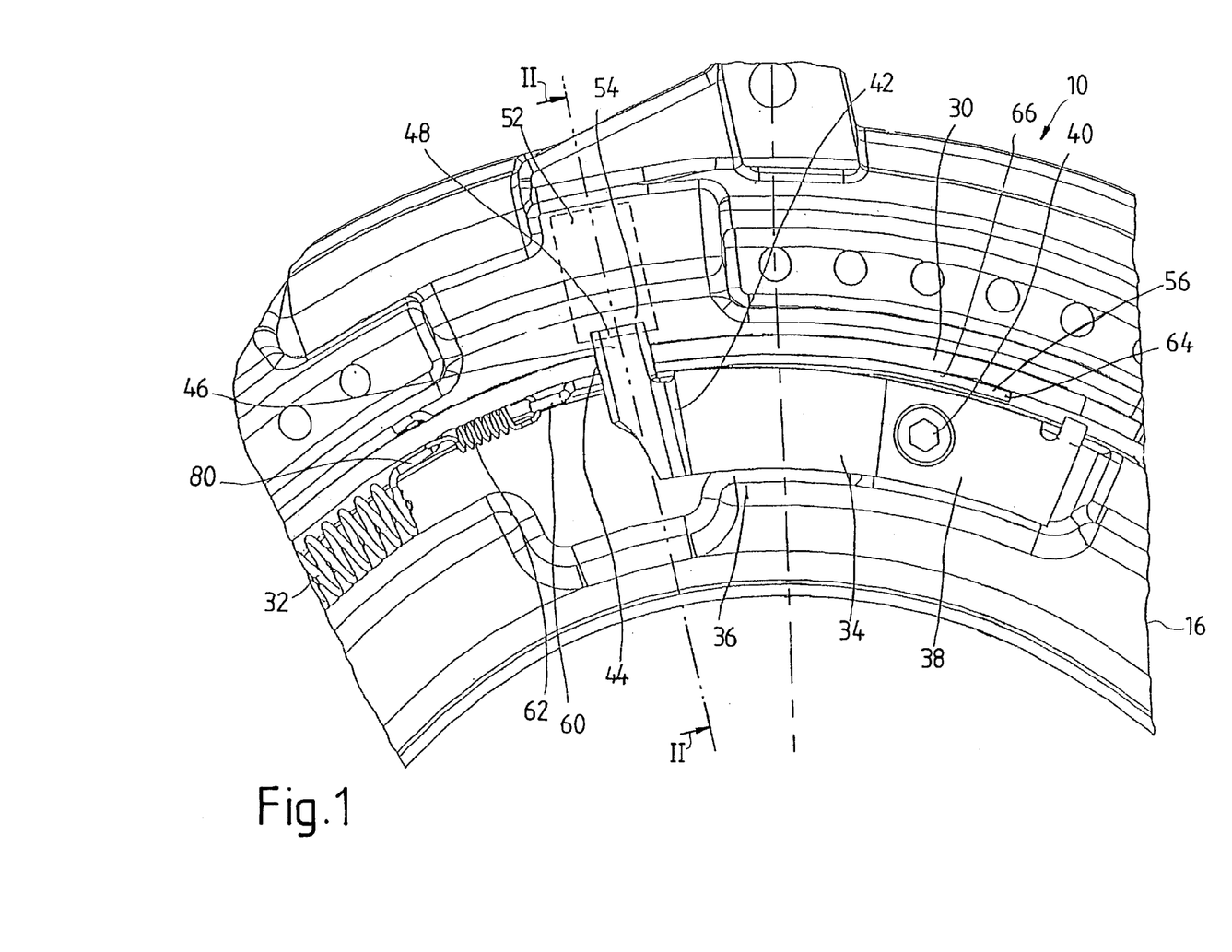
FIG. 1 is a partial axial view of a pressure plate assembly, in which the present invention can be implemented.
Figure 2:
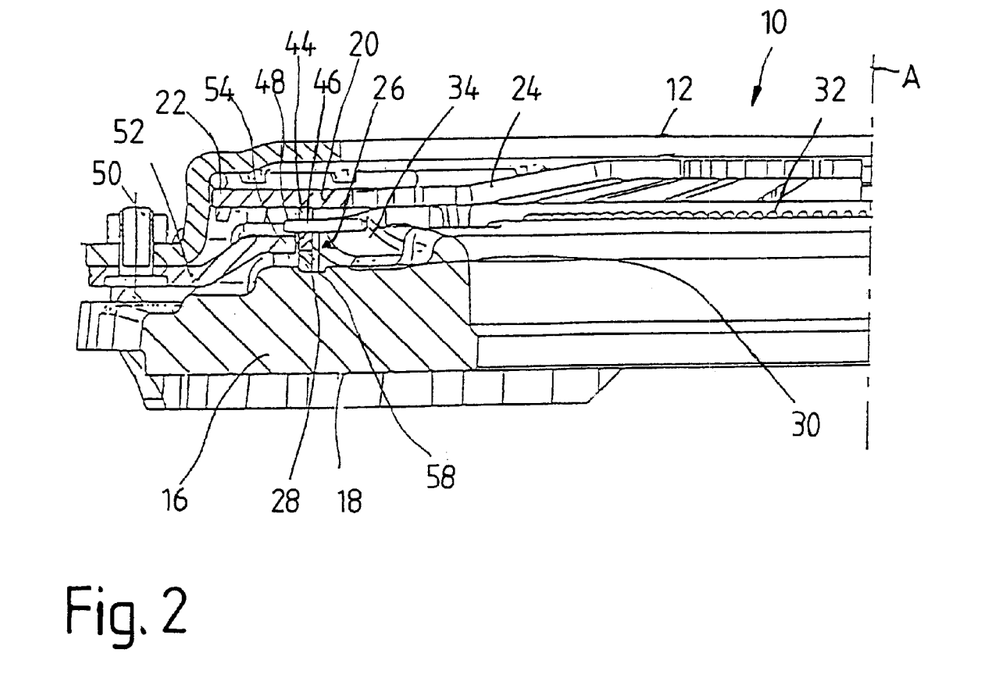
FIG. 2 is a longitudinal section of the pressure plate assembly shown in FIG. 1 along line II—II of FIG. 1.

The general structure of a pressure plate assembly in which the present invention can be implemented is described first with reference to FIGS. 1 and 2. Then the special design features of the present invention will be described with reference to FIGS. 3–6, which show various concrete design examples.

The pressure plate assembly 10 shown in FIGS. 1 and 2 comprises a housing 12, which is designed to be attached to a centrifugal mass arrangement (not shown in the figures), such as a one-part flywheel or a possibly a multiple-mass flywheel. A pressure plate 16 is provided inside the housing 12; the friction surface 18 of this plate can be pressed against a clutch disk (not shown in the figures), and the clutch disk can thus be pressed against a corresponding friction surface of the centrifugal mass arrangement. The pressure plate 16 is connected to the housing 12 by elements (not shown) such as tangential leaf springs or the like, so that it is free to move in the same direction as that in which the rotational axis A extends but is essentially prevented from rotating around the rotational axis A with respect to the housing 12.

A stored-energy element 20 is also installed in the housing 12. The radially outer area 22 of this element is supported on the housing 12. The radially inner area, i.e., in the area of the so-called "spring tongues" 24, is designed to be acted on by a release mechanism of the pull type. The radially intermediate area exerts force on the pressure plate 16 by way of a wear-compensating device 26, which will be described further below. It should be pointed out that a stored-energy element 20 and a pressure plate assembly 10 of the pull type are presented only as examples; it is obvious that the stored-energy element 20 could also be supported at a point radially inside the area in which it acts via the wear-compensating device 26 on the pressure plate 16 and thus be acted on by a release mechanism of the push type. In the illustrated design example, the wear-compensating device 26 comprises two adjusting rings 28, 30. Adjusting ring 28 is supported on the pressure plate 16, and the adjusting ring 30 receives the force exerted by the stored-energy element, i.e., by the diaphragm spring 20. The surfaces of the two adjusting rings 28, 30 which face each other are provided with complementary slanted or key-like areas, which create a key-like profile extending in the circumferential direction. Relative rotation of the two adjusting rings 28, 30 with respect to each other has the result that the total axial dimension of the wear-compensating device 26 is changed. The two adjusting rings 28, 30 are pretensioned for rotation with respect to each other by a helical tension spring 32 installed radially inside the adjusting rings 28, 30. One end of the spring 32 acts on the adjusting ring 28, whereas the other end acts on, for example, the pressure plate 16.

The gripping element 34 of a clearance-producing arrangement 36 is also provided on the pressure plate 16, radially inside the adjusting rings 28, 30. One of the circumferential end areas 38 of the gripping element 34 is fixed by means of a threaded bolt 40 to the pressure plate 16, while the other circumferential end area 42 of the gripping element 34 has a gripping section 46, which extends radially outward through a circumferential and axial slot 44 in the adjusting ring 30. The gripping element 34 is made of elastic material such as spring sheet or plate and is pretensioned in its installed state in such a way that it exerts axial force on the adjusting ring 30 and thus on the entire wear-compensating device 26. As a result of this pretensioning effect, the two adjusting rings 28, 30 are clamped between the gripping section 46 and the pressure plate 16, so that even the pretensioning effect of the spring 32 is unable to cause the adjusting rings 28, 30 to rotate relative to each other in a direction such that the total axial dimension of the wear-compensating device 26 is increased.

The free end 48 of the gripping section 46 of the gripping element 34 projects over a blocking element 52, which is attached to the housing 12 by bolt 50 and extends radially inward up as far as the adjusting rings 28, 30. There is therefore a radial overlap, as can be seen especially clearly in FIG. 1, between the end area 48 and a corresponding end area 54 of the blocking element 52.

The gripping element 34 of the clearance-producing arrangement 36 is also provided with an arresting element 56. This arresting element 56 extends radially inside the adjusting rings 28, 30, i.e., rests against their inside circumferential surfaces, and is guided in a corresponding recess 58 in the pressure plate 16, in which recess the adjusting ring 28 resting on this pressure plate 16 is also guided. A second helical tension spring 62 acts on the circumferential end area 60 of the arresting element 56, while the other end of this spring is fastened or hooked to the helical tension spring 32, namely to the end of this spring which cooperates with the adjusting ring 28, which can rotate in the circumferential direction around the rotational axis A, as will be described further below. The adjusting ring 30 is essentially blocked from rotating in the circumferential direction by the gripping element 34, i.e., by its gripping section 46 engaging the slot 44.

Starting from its end area 60 and proceeding to its free end 64, the arresting element 56 becomes larger in the axial direction; that is, it has a key-like shape extending in the circumferential direction between the two ends 60, 64, with the result that the smallest axial dimension is present in the area where the gripping section 46 is positioned over the arresting element 56, as shown in FIG. 1, whereas the largest axial dimension is present in the area near the end 64. Through the action of the spring 62, the arresting element 56 is thus pretensioned in the circumferential direction and forced to move until its key-like surface 66 strikes the gripping section 46 of the gripping element 34 and can therefore no longer move any farther in the circumferential direction.

The way in which the pressure plate assembly 10 according to the invention functions in rotational operating mode, especially upon the occurrence of wear, is described in the following.

In the new, as yet unworn state of the friction linings normally provided on the clutch disk, the two adjusting rings 28, 30 assume a predetermined relative rotational position when the pressure plate assembly 10 is assembled; in this predetermined position, the axial dimension of the wear-compensating device 26 is also the smallest because of the corresponding relative positioning of the slanted surface areas. In this position, furthermore, the spring 32 is under maximum pretension.

In this state, then, as already described, the adjusting rings 28, 30 are arrested with respect to each other by the pretensioning effect of the gripping element 34 and thus unable to rotate. In the engaged state, furthermore, the stored-energy element 20 is acting on the adjusting ring 30, with the result that the pressure plate 16, which in this situation is resting against the clutch disk, and the resulting opposing force provide another blocking effect on the two adjusting rings 28, 30, which also prevents them from moving. The blocking effect provided by the stored-energy element 20 is much stronger, however, because the stored-energy element 20 exerts a force much greater than the pretensioning force of the gripping element 34.

In this new state of the pressure plate assembly 10, it is also possible for the end section 48 of the gripping section 46 to be a certain axial distance away from the opposing end section 54 of the blocking element 52.

When now the friction linings become worn during operation, e.g., after repeated engagements and disengagements, the pressure plate 16 comes closer and closer to the centrifugal mass arrangement when in the engaged state, which, in the illustration of FIG. 2, corresponds to a movement of the pressure plate 16 in the downward direction relative to the housing 12. As this happens, the end section 48 of the gripping section 46 also moves closer to the blocking element 52. As soon as the amount of wear exceeds a certain value, the gripping section 46 is prevented from moving any farther by the blocking element 52. When additional wear then occurs, therefore, the gripping section 46 will be restrained in the axial direction by the blocking element 52 as the clutch is being engaged and thus lifted away from the adjusting ring 30 as the pressure plate 16 continues to move in the axial direction. A certain amount of axial play is thus created between the gripping section 46, which had previously being resting against the adjusting ring 30, and this adjusting ring 30. Because the stored-energy element 20 is still exerting its force on the adjusting rings 28, 30 during the clutch-engaging process and then in the engaged state, as described above, it is still impossible for any relative rotational motion to occur between the two adjusting rings 28, 30, even though the gripping element 34 is no longer exerting any blocking action. In the state in which the further movement of the gripping section 46 is blocked, the gripping section 46 would then in principle be forced to lose contact with the key surface 66 of the arresting element 56. But because this arresting element 56 is under the pretension of the spring 62, the arresting element is pulled into the gap which forms as soon as the rising movement of the gripping section 46 begins. The result of this is that, when a clutch-disengaging operation now occurs, in the course of which the end section 48 of the gripping section 46 rises axially again from the blocking element 52, the gripping section 46 is unable to make contact again with the wear-compensating device 26, which is still being prevented by the stored-energy element 20 from making an adjusting movement. Initially, therefore, at the beginning of the disengaging process, the clearance between the gripping section 46 and the adjusting ring 30 previously produced by wear remains.

During a subsequent clutch-disengaging process, however, the clamping action of the two adjusting rings 28, 30 relative to each other essentially disappears as a result of the elimination or reduction of the actuating force of the stored-energy element 20; whatever clamping force remains is provided at this point almost exclusively by the tangential leaf springs responsible for the return of the pressure plate 16. The axial pretensioning force of these springs, however, is comparatively weak. The adjusting ring 28 is therefore now able to move in the circumferential direction under the action of the helical tension spring 32; the adjusting ring 30 is prevented from moving in the circumferential direction by the gripping element 34. During this relative rotation between the two adjusting rings 28, 30 and the accompanying sliding movement of the various slanted surface areas along each other, the wear-compensating device 26 changes its axial dimension until the adjusting ring 30 comes to rest again against the gripping section 46. The axial dimension of the wear-compensating device 26 has thus been changed essentially to the same extent as that to which the gripping section 46 was previously raised from the adjusting ring 30, this distance corresponding in turn essentially to the extent to which the pressure plate 16 has moved closer, as a result of wear, to the flywheel arrangement in the engaged state. This means ultimately that, when a compensation process such as this has been completed, the wear which has been compensated is essentially the same as that to which the clearance-producing device 36 responded previously. The result is that the axial distance between the friction surface 18 of the pressure plate 16 and the area or point at which the stored-energy element 20 acts on the wear-compensating device 26 has been increased to the same extent that the thickness of the friction lining has decreased. The installation position of the stored-energy element therefore remains unchanged, even after wear has occurred, and thus there will be no change in the engaging or disengaging force characteristic in this type of pressure plate assembly.

Hooking the spring 62 onto the end of the spring 32, which works together with the moving adjusting ring 28, has the result that, even under increasing wear and increasing circumferential movement of the arresting element 56, the spring 62 does not relax to any significant degree. Instead, it is ensured that the spring 62 is put under tension again by the movement of the adjusting ring 28 which occurs as part of the compensation process—the arresting element 56 being held stationary at this time, so that, when more wear occurs, essentially the same amount of pretensioning force is still available to the arresting device for movement in the circumferential direction.

It should be pointed that, in principle, the design of the pressure plate assembly with wear compensation which has been described above can be modified in a wide variety of ways. For example, it is possible for the wear-compensating device 26 to have only a single adjusting ring, which, when wear occurs and a compensation process is being performed, can move in the circumferential direction around rotational axis A; the slanted surface areas provided on it thus slide along complementary slanted surface areas on the pressure plate. It is also possible to provide several wear-compensating elements which are capable of moving independently of each other and which do not necessarily have to be in the form of rings. Individual key elements, which are actuated by associated spring arrangements and which cooperate with separate gripping elements, could also be provided.

Figure 3:
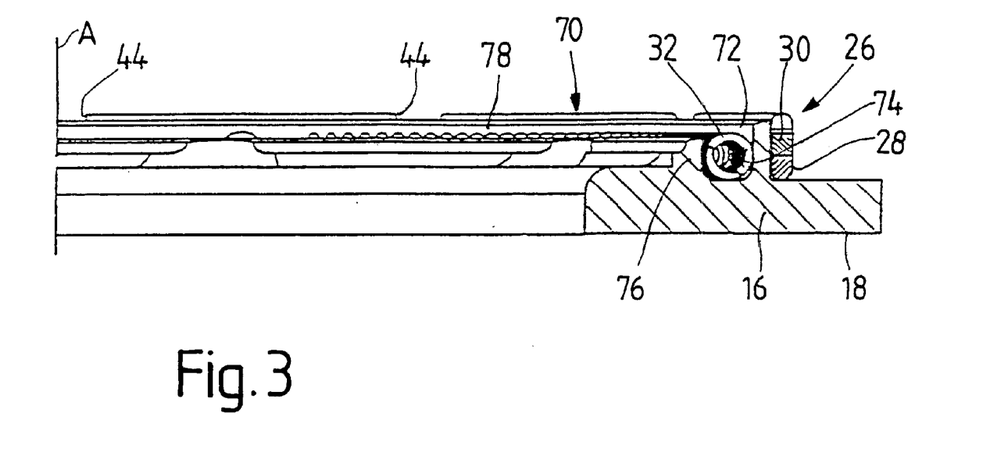
FIG. 3 is a longitudinal section similar to that of FIG. 2 of part of the pressure plate assembly according to the invention comprising essentially the pressure plate and the wear-compensating device.

FIG. 3 shows a detailed view of a first design variant of the present invention, which can be used in the pressure plate assembly shown in FIGS. 1 and 2 and described in detail above. It can be seen that here, too, the spring 32, by means of which the adjusting ring 28 is or can be pretensioned for movement in the circumferential direction around the rotational axis A, is positioned radially inside the wear-compensating device 26 and extends over a relatively large angular distance next to the wear-compensating device 26. In this design variant of a pressure plate assembly, a support arrangement 70 is provided for the spring 32. This support arrangement comprises a support recess 72 in the pressure plate 16, made as an integral part thereof, this recess extends in the circumferential direction and thus ultimately forms a support channel 74 for the spring 32. A radially inner wall area 76, which can be designed with openings, for example, supports the spring 32 radially from the inside and thus holds the spring 32 in its curved configuration against its natural tendency to stretch out in a straight line. A radially outer wall section 78 supports the spring 32 radially from the outside, which is especially important when centrifugal forces are being generated, and thus ensures that the spring 32 will not come to rest against the wear-compensating device 26 even under the effect of centrifugal force. This radially outer wall section 78 can also serve at the same time to guide or position the adjusting rings 28, 30.

To make it possible for the spring 32 to interact with the adjusting ring 28, for example, so that, as can be seen in FIG. 1, the hook-like end 80 of the spring 32 can be hooked onto the adjusting ring 28, the radially outer wall section 78 has at least one opening extending in the circumferential direction, through which the hook-like end 80 of the spring 32 can pass. The circumferential extent of this opening must be designed so that it allows the hook-like end 80 of the spring 32 to move when wear occurs and the adjusting ring 28 rotates as a result of such wear.

Figure 4:
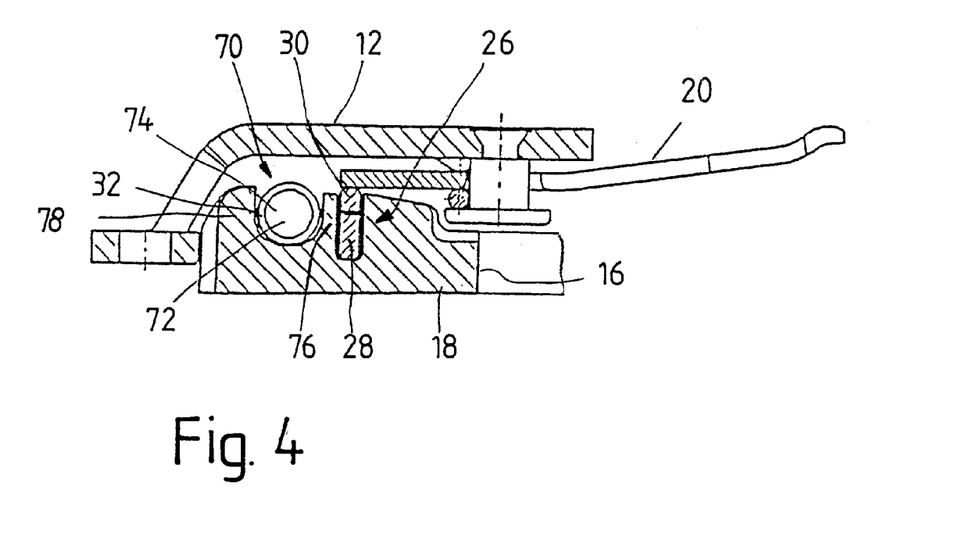
FIG. 4 shows a modification of the design variant shown in FIG. 3.

In the design variant shown in FIG. 4, the support arrangement 70, that is, the recess 72 forming the support channel 74, is now radially outside the wear-compensating device 26. The radially inner wall section 76 now separates the spring 32 from the adjusting device 26 and thus prevents this spring 32, which extends in a curve over a relatively long circumferential distance, from coming to rest and exerting pressure against the wear-compensating device 26 as a result of its own elastic force. The radially inner wall section 76 has an opening, through which the spring 32 can interact with the adjusting ring 28. The radially outer wall section 78 forming the boundary of the support channel 74 on the radially outer side now serves to support the spring 32 against centrifugal forces.

In the design variants shown in FIGS. 3 and 4, the support arrangement 70 is ultimately provided as an integral component of the pressure plate 16; that is, no additional components are required to support the spring 32 radially from the outside or radially from the inside. This greatly simplifies the process of assembling a pressure plate assembly designed in this way, but it also requires the introduction of the appropriate recess, i.e., the appropriate wall sections, in the pressure plate during the fabrication of the plate. This can be done, for example, by providing the casting mold with an appropriate design or by providing a subsequent machining step.

It should be pointed out in this context that, for example, it can be seen in FIG. 4 that it is irrelevant to the principles of the present invention whether the pressure plate assembly is of the pulled type, as described above with reference to FIGS. 1 and 2, or of the pushed type, as illustrated in FIG. 4. The principles of the present invention can also be applied in conjunction with other clearance-producing devices, although the design of the clearance-producing device described above with reference to FIGS. 1 and 2 is preferred as a result of the high degree of precision with which it functions.

Figure 5:
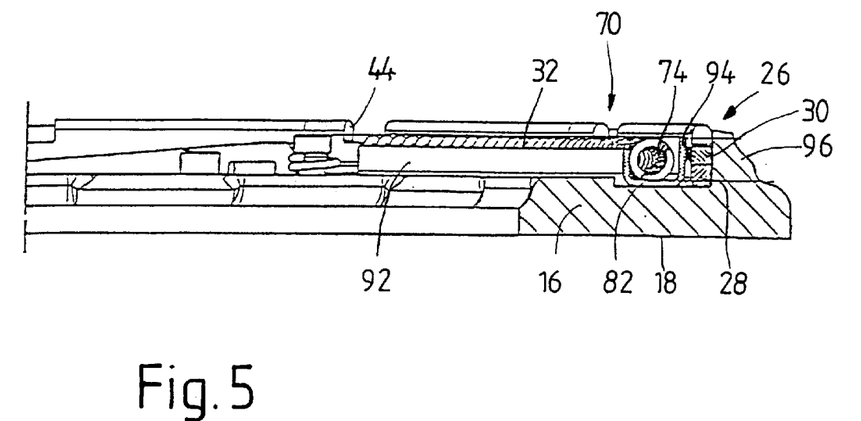
FIG. 5 is a similar view of an alternative embodiment of the pressure plate assembly according to the invention.
Figure 6:
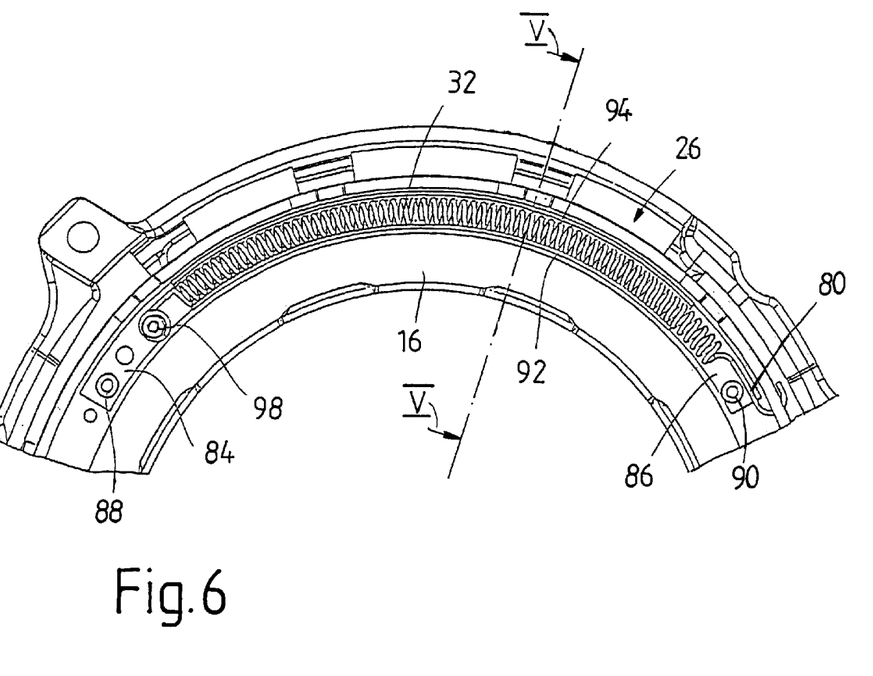
FIG. 6 is a partial axial view of the components of the pressure plate assembly illustrated in FIG. 5.

FIGS. 5 and 6 show another modified design variant, in which a support device 70 is provided. Here, too, the spring 32 is located radially inside the wear-compensating device 26, that is, radially inside the adjusting rings 28, 30.

The support arrangement 70 comprises here, for example, a support element 82, consisting of, for example, a piece of sheet metal bent into an appropriate shape. As can be seen in FIG. 6, this element is attached at both circumferential ends 84, 86, by threaded bolts 88, 90 to the pressure plate 16 and extends in a curve over a relatively large angular distance next to the wear-compensating device 26. The support element 82 has an approximately U-shaped cross section, with a radially inner wall section 92 and a radially outer wall section 94. The radially inner wall section 92 again serves to keep the spring 32 in a curved configuration against its own elastic force. The radially outer wall section 94 prevents the spring 32 from coming to rest against the wear-compensating device 26 under the effect of centrifugal force. In addition to the guide function provided by the radially outer wall section 94, additional guidance is provided by a positioning arrangement 96, which is attached to the pressure plate 16 radially outside the wear-compensating device 26 to help keep it in position.

In the design variant shown FIGS. 5 and 6, the support element 82 ultimately forms the support channel 74, in which the spring 32 is supported both radially from the outside and radially from the inside. It should also be pointed out that it can be seen in FIG. 6 that the end of the spring 32 pointing away from the connection to the adjusting ring 28 is fastened to the pressure plate 16 by a fastening bolt, such as a fastening screw 98 or the like. This screw 98 can also serve simultaneously to fasten the support element 82 to the pressure plate 16. As an alternative, it is also possible to use this threaded bolt 98 merely to attach the spring 32 to the support element 82, which means, for example, that the support element 82 and the spring 32 can be provided as a preassembled unit. In this preassembled state, the hook-like end 80 of the spring 32 can be hooked onto the end of the radially outer wall section 94, so that the spring 32 is already held under tension.

It can also be seen from FIG. 6 that, in the end area 86 of the support element 82, at least the radially outer wall section 94 terminates a comparatively large distance away from the hook-like end 80 of the spring 32 in the completely assembled state. In this way it becomes possible for this hook-like end section to execute the circumferential movement required for wear compensation.

When a separate support element 82 is used, as can be seen in FIGS. 5 and 6, it is possible in particular to produce it out of, or to coat it with, a material which offers especially favorable sliding friction properties for interaction with the spring 32, although this material must also be strong enough to prevent the spring from possibly digging into the various wall sections under the prevailing forces.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly for a friction clutch, comprising a housing having an axis of rotation, a pressure plate mounted in said housing with freedom to move axially, a stored energy element mounted in said housing and transmitting force along a path from said housing to said pressure plate, a wear compensating device in the path of force transmission, said wear compensating device comprising at least one adjusting element which is movable in an adjusting direction to compensate for wear, and at least one spring element which pretensions the at least one adjusting element for movement in the adjusting direction, at least parts of said at least one spring element extending in a circumferential direction with respect to said axis of rotation, and support means for supporting said parts of said at least one spring element at least one of radially inside and radially outside with respect to said rotational axis, wherein said support means comprises a channel on one of said pressure plate and said housing, said at least one spring element being received in said channel, said channel having a radially inside wall and a radially outside wall.

2. A pressure plate assembly as in claim 1 wherein one of said radially inside and said radially outside walls separates said at least one spring element from said at least one adjusting element, said one of said walls having parts which are radially open to allow interaction between said at least one spring element and said at least one adjusting element.

3. A pressure plate assembly as in claim 1 wherein said wear-compensating device acts between said stored energy element and said pressure plate, and wherein said support means is provided on said pressure plate.

4. A pressure plate assembly as in claim 1 wherein said at least one adjusting element comprises an adjusting ring which can rotate about said rotational axis, said parts of said spring element being radially adjacent to said adjusting ring.

5. A friction clutch comprising a pressure plate assembly, said pressure plate assembly comprising a housing having an axis of rotation, a pressure plate mounted in said housing with freedom to move axially, a stored energy element mounted in said housing and transmitting force along a path from said housing to said pressure plate, a wear compensating device in the path of force transmission, said wear compensating device comprising at least one adjusting element which is movable in an adjusting direction to compensate for wear, and at least one spring element which pretensions the at least one adjusting element for movement in the adjusting direction, at least parts of said at least one spring element extending in a circumferential direction with respect to said axis of rotation, and support means for supporting said parts of said at least one spring element at least one of radially inside and radially outside with respect to said rotational axis, wherein said support means comprises a channel on one of said pressure plate and said housing, said at least one spring element being received in said channel, said channel having a radially inside wall and a radially outside wall.

6. A friction clutch comprising a pressure plate assembly, said pressure plate assembly comprising a housing having an axis of rotation, a pressure plate mounted in said housing with freedom to move axially, a stored energy element mounted in said housing and transmitting force along a path from said housing to said pressure plate, a wear compensating device in the path of force transmission, said wear compensating device comprising at least one adjusting element which is movable in an adjusting direction to compensate for wear, and at least one spring element which pretensions the at least one adjusting element for movement in the adjusting direction, at least parts of said at least one spring element extending in a circumferential direction with respect to said axis of rotation, and support means for supporting said parts of said at least one spring element at least one of radially inside and radially outside with respect to said rotational axis, wherein said support means comprises a support element attached to one of said pressure plate and said housing, said support element having a radially inner support wall and a radially outer support wall.

7. A friction clutch comprising a pressure plate assembly, said pressure plate assembly comprising a housing having an axis of rotation, a pressure plate mounted in said housing with freedom to move axially, a stored energy element mounted in said housing and transmitting force along a path from said housing to said pressure plate, a wear compensating device in the path of force transmission, said wear compensating device comprising at least one adjusting element which is movable in an adjusting direction to compensate for wear, and at least one spring element which pretensions the at least one adjusting element for movement in the adjusting direction, at least parts of said at least one spring element extending in a circumferential direction with respect to said axis of rotation, and support means for supporting said parts of said at least one spring element at least one of radially inside and radially outside with respect to said rotational axis, wherein said support means comprises a recess formed in one of said pressure plate and said housing arrangement, said recess having a radially inner boundary wall and a radially outer boundary wall.

8. A pressure plate assembly for a friction clutch, comprising a housing having an axis of rotation, a pressure plate mounted in said housing with freedom to move axially, a stored energy element mounted in said housing and transmitting force along a path from said housing to said pressure plate, a wear compensating device in the path of force transmission, said wear compensating device comprising at least one adjusting element which is movable in an adjusting direction to compensate for wear, and at least one spring element which pretensions the at least one adjusting element for movement in the adjusting direction, at least parts of said at least one spring element extending in a circumferential direction with respect to said axis of rotation, and support means for supporting said parts of said at least one spring element at least one of radially inside and radially outside with respect to said rotational axis, wherein said support means comprises a support element attached to one of said pressure plate and said housing, said support element having a radially inner support wall and a radially outer support wall.

9. A pressure plate assembly as in claim 8 wherein said wear-compensating device acts between said stored energy element and said pressure plate, and wherein said support means is provided on said pressure plate.

10. A pressure plate assembly as in claim 8 wherein said at least one adjusting element comprises an adjusting ring which can rotate about said rotational axis, said parts of said spring element being radially adjacent to said adjusting ring.

11. A pressure plate assembly for a friction clutch, comprising a housing having an axis of rotation, a pressure plate mounted in said housing with freedom to move axially, a stored energy element mounted in said housing and transmitting force along a path from said housing to said pressure plate, a wear compensating device in the path of force transmission, said wear compensating device comprising at least one adjusting element which is movable in an adjusting direction to compensate for wear, and at least one spring element which pretensions the at least one adjusting element for movement in the adjusting direction, at least parts of said at least one spring element extending in a circumferential direction with respect to said axis of rotation, and support means for supporting said parts of said at least one spring element at least one of radially inside and radially outside with respect to said rotational axis, wherein said support means comprises a recess formed in one of said pressure plate and said housing arrangement, said recess having a radially inner boundary wall and a radially outer boundary wall.

12. A pressure plate assembly as in claim 11 wherein said wear-compensating device acts between said stored energy element and said pressure plate, and wherein said support means is provided on said pressure plate.

13. A pressure plate assembly as in claim 11 wherein said at least one adjusting element comprises an adjusting ring which can rotate about said rotational axis, said parts of said spring element being radially adjacent to said adjusting ring.

* * * * *